US012747813B2

(12) United States Patent
Wiersma

(10) Patent No.: US 12,747,813 B2
(45) Date of Patent: Sep. 29, 2026

(54) CLAMP

(71) Applicant: TRIDON MPC INDUSTRIES B.V., Gorredijk (NL)

(72) Inventor: Martin Wiersma, Leeuwarden (NL)

( * ) Notice: Subject to any disclaimer, the term of this patent is extended or adjusted under 35 U.S.C. 154(b) by 0 days.

(21) Appl. No.: 18/992,896

(22) PCT Filed: Jul. 15, 2022

(86) PCT No.: PCT/EP2022/069931
§ 371 (c)(1),
(2) Date: Jan. 9, 2025

(87) PCT Pub. No.: WO2024/012698
PCT Pub. Date: Jan. 15, 2024

(65) Prior Publication Data
US 2025/0264173 A1 Aug. 21, 2025

(51) Int. Cl.
*F16L 33/08* (2006.01)
*F16B 2/06* (2006.01)
*F16B 2/08* (2006.01)

(52) U.S. Cl.
CPC .............. *F16L 33/08* (2013.01); *F16B 2/065* (2013.01); *F16B 2/08* (2013.01); *F16L 33/085* (2013.01)

(58) Field of Classification Search
CPC . F16L 33/08; F16L 33/085; F16B 2/08; F16B 2/065
See application file for complete search history.

(56) References Cited

U.S. PATENT DOCUMENTS

| | | | | |
|---|---|---|---|---|
| 3,116,529 | A | 1/1964 | Henning | |
| 3,405,432 | A | 10/1968 | Scaravelli | |
| 4,103,637 | A * | 8/1978 | Luc | F16L 33/08 |
| 4,445,254 | A | 5/1984 | Allert | |
| 4,677,712 | A * | 7/1987 | Allert | F16L 33/08 |
| 5,063,642 | A | 11/1991 | Toth | |
| 5,410,781 | A * | 5/1995 | Anjos | F16L 33/08 |
| 5,909,852 | A | 6/1999 | Allert | |

(Continued)

FOREIGN PATENT DOCUMENTS

| | | | | |
|---|---|---|---|---|
| DE | 102011122958 B3 | | 2/2011 | |
| FR | 1484749 A | * | 5/1966 | F16L 33/08 |

(Continued)

OTHER PUBLICATIONS

FR1484749A—Machine Translation—English (Year: 1966).*

(Continued)

*Primary Examiner* — William S. Choi
(74) *Attorney, Agent, or Firm* — Barnes & Thornburg LLP

(57) ABSTRACT

A clamp includes a band and a tensioner. The tensioner includes a fixed mount coupled to the band, a screw housing engaged with the fixed mount, and a screw received in the screw housing. The screw housing and the screw can move relative to the fixed mount between an engaged position and a disengaged position. When a portion of the band including a plurality of slots is positioned between the fixed mount and the screw housing, a thread of the screw is received in the plurality of slots when the screw housing and the screw are in the engaged position but is spaced apart from the plurality of slots when the screw housing and the screw are in the disengaged position.

16 Claims, 7 Drawing Sheets

(56) References Cited

U.S. PATENT DOCUMENTS

| | | | | |
|---|---|---|---|---|
| 6,389,654 | B1 | 5/2002 | Tunno et al. | |
| 9,556,988 | B2 | 1/2017 | Henrich et al. | |
| 2012/0124784 | A1 | 5/2012 | Chung et al. | |
| 2014/0201956 | A1* | 7/2014 | Henrich | F16L 33/085 |
| 2018/0340557 | A1 | 11/2018 | Bowater | |

FOREIGN PATENT DOCUMENTS

| | | | | | |
|---|---|---|---|---|---|
| GB | 765243 | A | | 1/1955 | |
| GB | 1022614 | A | * | 3/1966 | F16L 33/08 |
| GB | 1337246 | A | * | 11/1973 | |
| JP | H10299962 | A | | 11/1998 | |
| KR | 1334852 | B1 | * | 12/2013 | |

OTHER PUBLICATIONS

KR-1334852-B1—Machine Translation—English (Year: 2013).*

European Patent Office, International Search Report for PCT/EP2022/069931, mailed Mar. 16, 2023, 3 pages.

European Patent Office, Written Opinion of the International Searching Authority for PCT/EP2022/069931, mailed Mar. 16, 2023, 8 pages.

Zero Clips Ltd., Jolly Quick Release Full SS, Mar. 2022, 2 pages.

Zero Clips Ltd., Zero Clips Brand Quick Release Clamps, Mar. 2022, 2 pages.

Japanese Patent Office, Notice of Reasons for Refusal of Japanese Patent Application No. 2025-525183, Jul. 17, 2026, 12 pages (including machine translation).

* cited by examiner

CLAMP

TECHNICAL FIELD

The present disclosure relates to a clamp that includes a band and a tensioner. More particularly, the present disclosure relates to a clamp with a tensioner including a screw that rotates to tighten or loosen a band.

SUMMARY

According to one aspect, a clamp may comprise a band and a tensioner. The band may include a first end, a second end opposite the first end, and a plurality of slots spaced apart from one another between the first and second ends. The tensioner may comprise a fixed mount including (i) a base panel coupled to the first end of the band, the base panel including opposing first and second sides, (ii) a first flange coupled to the first side of the base panel and formed to include a first guide channel, and (iii) a second flange coupled to the second side of the base panel and formed to include a second guide channel. The tensioner may further comprise a screw housing arranged above the base panel and between the first and second flanges of the fixed mount, the screw housing including a first wing that is received in the first guide channel and a second wing that is received in the second guide channel. The tensioner may further comprise a screw received in the screw housing. The screw housing and the screw can move relative to the fixed mount between (i) an engaged position in which the first wing is positioned at a lower end of the first guide channel and the second wing is positioned at a lower end of the second guide channel and (ii) a disengaged position in which the first wing is positioned at an upper end of the first guide channel and the second wing is positioned at an upper end of the second guide channel. When a portion of the band including the plurality of slots is positioned between the fixed mount and the screw housing, a thread of the screw may be (i) received in the plurality of slots when the screw housing and the screw are in the engaged position and (ii) spaced apart from the plurality of slots when the screw housing and the screw are in the disengaged position.

In some embodiments, the screw is rotatable within the screw housing about a screw axis, wherein movement of the portion of the band positioned between the fixed mount and the screw housing requires rotation of the screw about the screw axis when the screw housing and the screw are in the engaged position, and wherein movement of the portion of the band positioned between the fixed mount and the screw housing does not require rotation of the screw about the screw axis when the screw housing and the screw are in the disengaged position.

In some embodiments, the screw axis is parallel to the base panel when the screw housing and the screw are in the engaged position.

In some embodiments, the screw axis is parallel to the base panel when the screw housing and the screw are in the disengaged position.

In some embodiments, each of the first and second guide channels is linear and arranged at an angle relative to the base panel. In some embodiments, the angle is acute. In some embodiments, the angle is between 10 and 45 degrees. In some embodiments, the angle is between 25 and 35 degrees. In some embodiments, each of the first and second guide channels has a length between its lower and upper ends that is greater than a depth of the thread of the screw divided by a sine of the angle.

In some embodiments, each of the lower ends of the first and second guide channels is spaced apart from the base panel by a first distance, and wherein each of the upper ends of the first and second guide channels is spaced apart from the base panel by a second distance greater than the first distance.

According to another aspect, a clamp may comprise a band and a tensioner. The band may include a first end, a second end opposite the first end, and a plurality of slots spaced apart from one another between the first and second ends. The tensioner may comprise a fixed mount including (i) a base panel coupled to the first end of the band, the base panel including opposing first and second sides, (ii) a first flange coupled to the first side of the base panel and formed to include a first guide channel, and (iii) a second flange coupled to the second side of the base panel and formed to include a second guide channel. The tensioner may further comprise a screw housing arranged above the base panel and between the first and second flanges of the fixed mount, the screw housing including a first wing that is received in the first guide channel and a second wing that is received in the second guide channel. The tensioner may further comprise a screw rotatable within the screw housing about a screw axis. The screw housing and the screw can move relative to the fixed mount between (i) an engaged position in which the first wing is positioned at a lower end of the first guide channel and the second wing is positioned at a lower end of the second guide channel and (ii) a disengaged position in which the first wing is positioned at an upper end of the first guide channel and the second wing is positioned at an upper end of the second guide channel. When a portion of the band including the plurality of slots is positioned between the fixed mount and the screw housing, movement of the portion of the band positioned between the fixed mount and the screw housing (i) requires rotation of the screw about the screw axis when the screw housing and the screw are in the engaged position and (ii) does not require rotation of the screw about the screw axis when the screw housing and the screw are in the disengaged position.

In some embodiments, the screw axis is parallel to the base panel when the screw housing and the screw are in the engaged position.

In some embodiments, the screw axis is parallel to the base panel when the screw housing and the screw are in the disengaged position.

In some embodiments, each of the first and second guide channels is linear and arranged at an acute angle relative to the base panel. In some embodiments, each of the first and second guide channels has a length between its lower and upper ends that is greater than a depth of the thread of the screw divided by a sine of the acute angle. In some embodiments, the angle is between 25 and 35 degrees.

According to another aspect, a clamp may comprise a band and a tensioner. The band may include a plurality of slots formed therein. The tensioner may comprise (i) a fixed mount coupled to an end of the band, (ii) a screw housing engaged with the fixed mount such that the screw housing can move relative to the fixed mount between an engaged position and a disengaged position, and (iii) a screw rotatable within the screw housing about a screw axis. When a portion of the band including the plurality of slots is positioned between the fixed mount and the screw housing, a thread of the screw is (i) received in the plurality of slots when the screw housing is in the engaged position, such that movement of the portion of the band requires rotation of the screw about the screw axis, and (ii) spaced apart from the plurality of slots when the screw housing is in the disengaged position, such that movement of the portion of the band does not require rotation of the screw about the screw axis.

In some embodiments, the screw axis is parallel to the portion of the band positioned between the fixed mount and the screw housing, both when the screw housing is in the engaged position and when the screw housing is in the disengaged position.

In some embodiments, the fixed mount includes (i) a base panel including opposing first and second sides, the base panel being coupled to the end of the band, (ii) a first flange coupled to the first side of the base panel and formed to include a first guide channel, and (iii) a second flange coupled to the second side of the base panel and formed to include a second guide channel. The screw housing may be arranged above the base panel and between the first and second flanges of the fixed mount. The screw housing may include a first wing that is received in the first guide channel and a second wing that is received in the second guide channel. The first wing may be positioned at a lower end of the first guide channel and the second wing may be positioned at a lower end of the second guide channel when the screw housing is in the engaged position. The first wing may be positioned at an upper end of the first guide channel and the second wing may be positioned at an upper end of the second guide channel when the screw housing is in the disengaged position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The concepts described in the present disclosure are illustrated by way of example and not by way of limitation in the accompanying figures. Where considered appropriate, the same reference labels or similar reference labels (e.g., reference labels ending in the same two digits) have been repeated among the figures to indicate corresponding or analogous elements. The detailed description particularly refers to the accompanying figures in which.

DETAILED DESCRIPTION OF THE DRAWINGS

Figure 1:
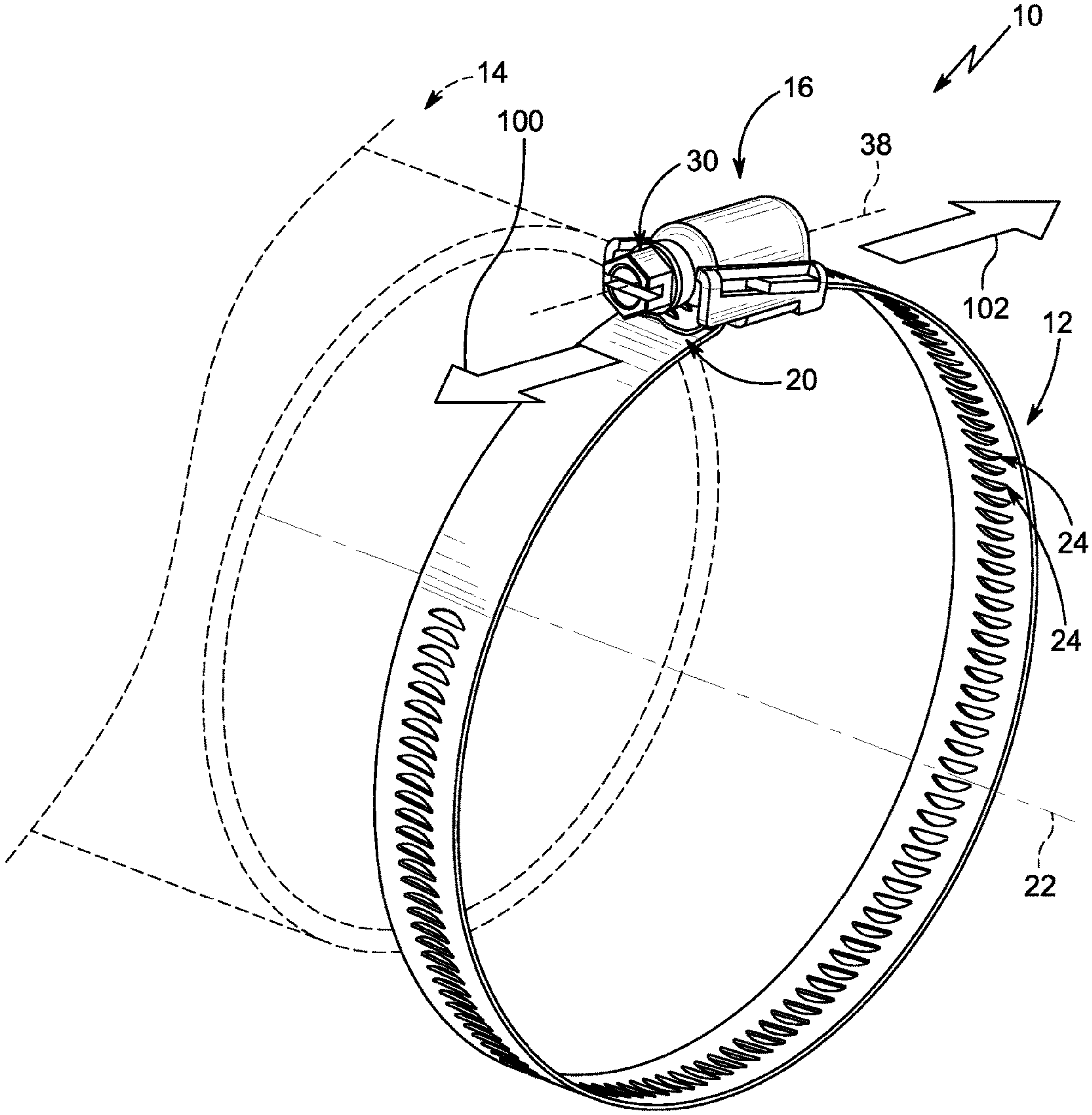
FIG. 1 is a perspective view of a clamp including a band that is configured to be positioned around a conduit (e.g., a hose) and a tensioner configured to tighten the band around the conduit.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but, on the contrary, the intention is to cover all modifications, equivalents, and alternatives falling within the spirit and scope of the invention as defined by the appended claims.

In the following description, numerous specific details, such as types and interrelationships of components, are set forth in order to provide a more thorough understanding of the present disclosure. It will be appreciated, however, by one skilled in the art that embodiments of the disclosure may be practiced without such specific details. In other instances, various components have not been shown in detail (or not labeled in every instance) in order to not obscure the invention. Those of ordinary skill in the art, with the included descriptions, will be able to implement appropriate functionality without undue experimentation.

References in the specification to "one embodiment," "an embodiment," "an illustrative embodiment," etcetera, indicate that at least one embodiment described may include a particular feature, structure, or characteristic, but not every embodiment necessarily includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the illustrative embodiment shown in FIG. 1, a clamp 10 includes a band 12 that is configured to be placed around a conduit 14, such as a hose. The clamp 10 also includes a tensioner 16 that is configured to tighten the band 12 on the conduit 14 to join the conduit 14 to a fixture, a coupling, or another conduit, for example. The tensioner 16 includes a screw 30 that has a thread 80 which is received in slots 24 formed in the band 12 to tighten or loosen the band 12 upon rotation of the screw 30 about a screw rotation axis 38. However, the tensioner 16 also provides a quick-tightening function when an end 20 of the band 12 is pulled in a tightening direction 100 through the tensioner 16 without rotation of the screw 30. The tensioner 16 subsequently blocks movement of the band 12 in a loosening direction 102, opposite the tightening direction 100, when the band 12 is under tension.

The band 12 is illustratively made from a strip of metallic material and includes two, opposite ends 18, 20. The band 12 can be bent, as shown in FIG. 1, to extend annularly around a central axis 22. The band 12 is formed to include a plurality of slots 24 spaced apart from one another between the ends 18, 20. The tensioner 16 is configured to interact with the plurality of slots 24 both to retain the band 12 in its annular form shown in FIG. 1 and to tighten or loosen the band 12 by rotating the screw 30 and/or by pushing and pulling the end 20 relative to the tensioner 16. Although the band 12 is illustrative shown as encircling a round conduit 14, it should be appreciated that the band 12 may be bent around conduits and structures having other shapes.

As best seen in FIGS. 2-9, the tensioner 16 includes a fixed mount 26 coupled to the band 12, a screw housing 28 engaged with the fixed mount 26, and the screw 30 received in the screw housing 28. The fixed mount 26 is formed to include one or more retainer tabs 32, 34 which extend through one or more apertures 33 formed in or near the end 18 of the band 12 to securely couple the fixed mount 26 to the band 12. The screw housing 28 defines a screw-receiving space 36 which receives a portion of the screw 30 to locate the screw 30 between the fixed mount 26 and the band 12. The screw 30 can move with the screw housing 28 and rotate relative to the screw housing 28 about the screw rotation axis 38. The end 20 of the band 12 is inserted between the screw 30 and the fixed mount 26 so that the plurality of slots 24 can interface and interact with the thread 80 of the screw 30.

Figure 2:
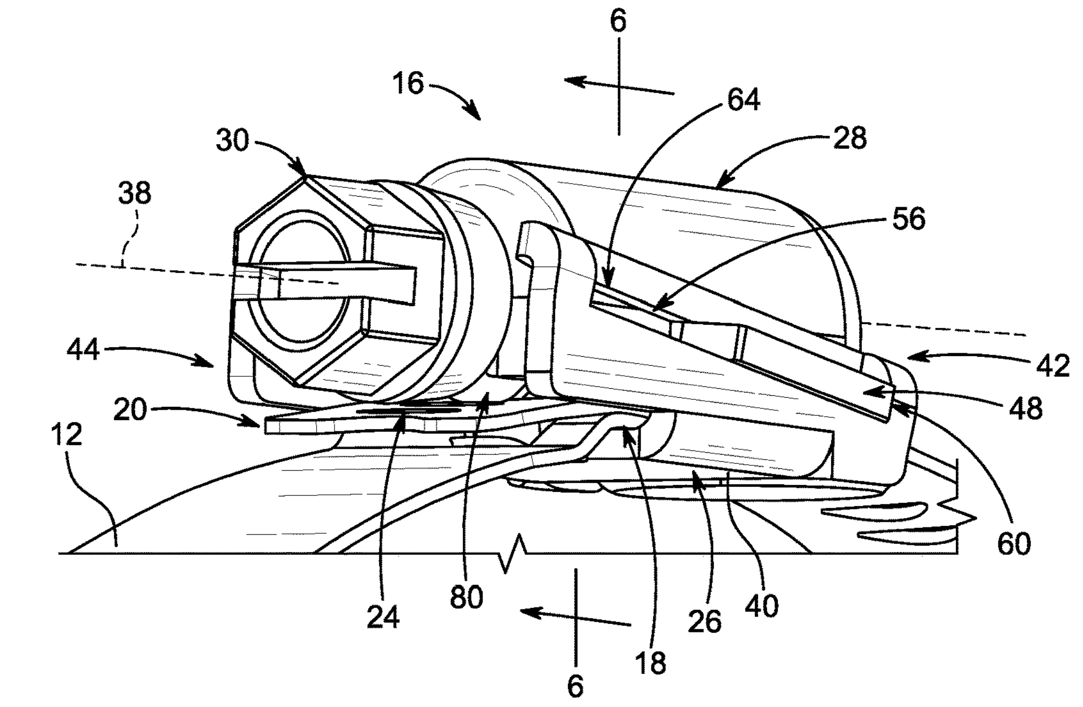
FIG. 2 is an enlarged perspective view of a portion of the clamp of FIG. 1, showing a screw housing and a screw of the tensioner in an engaged position relative to a fixed mount of the tensioner.
Figure 3:
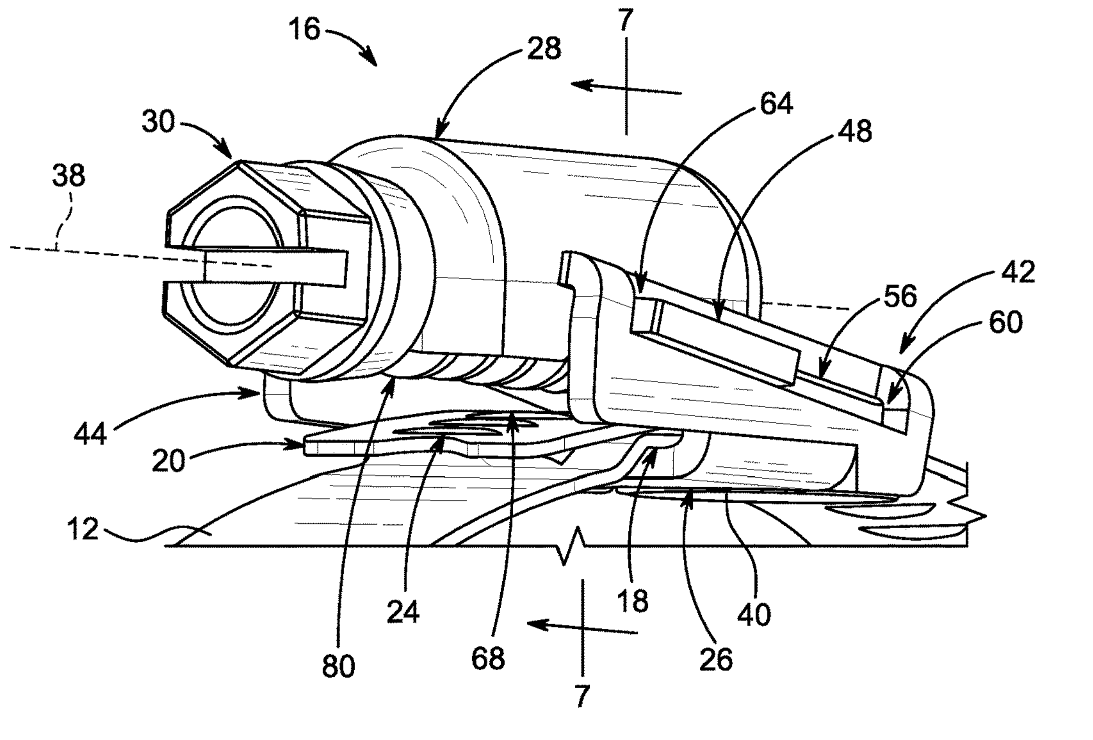
FIG. 3 is an enlarged perspective view of the portion of the clamp shown in FIG. 2, now showing the screw housing and the screw of the tensioner in a disengaged position relative to the fixed mount of the tensioner.
Figure 4:
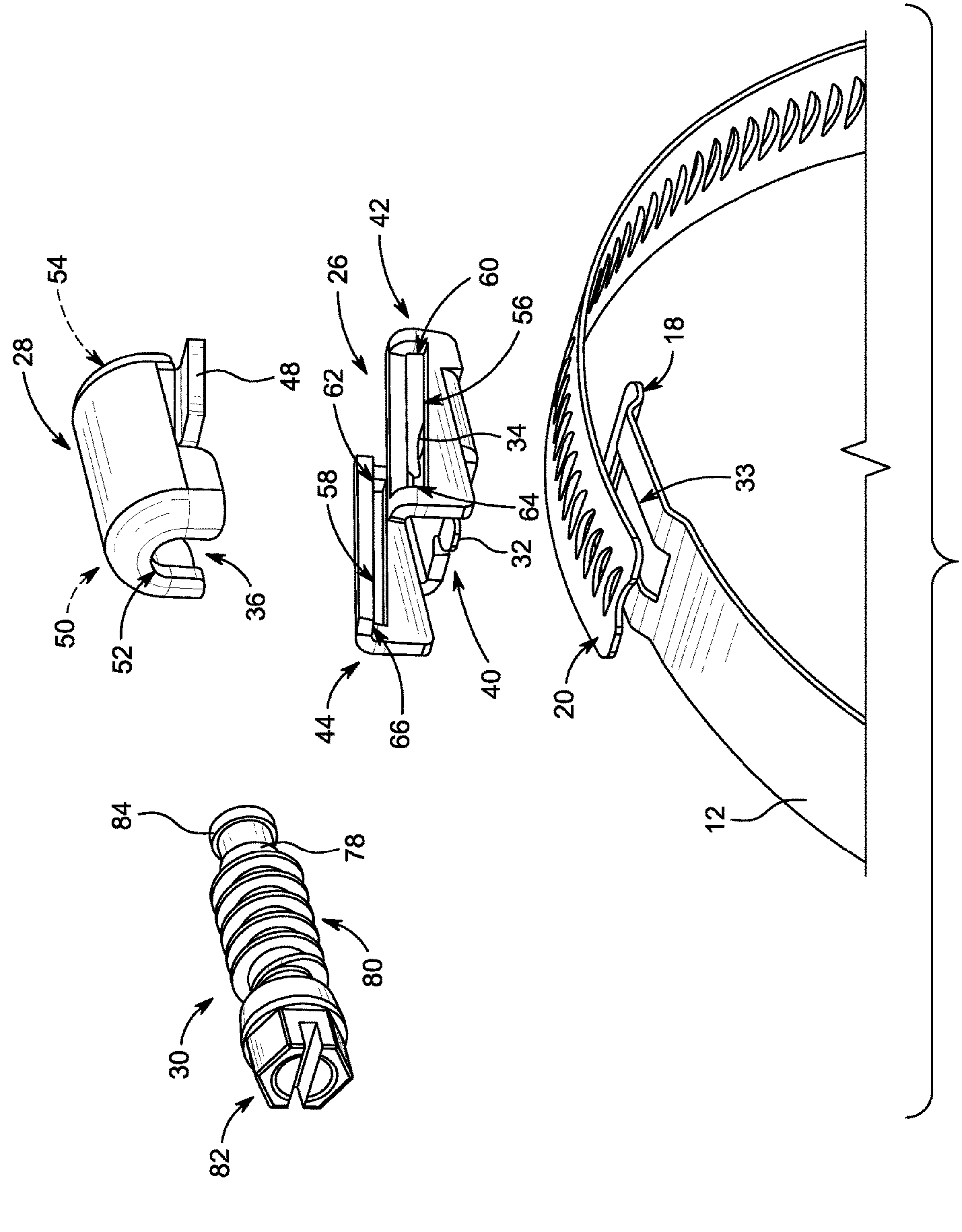
FIG. 4 is an exploded assembly view of a portion of the clamp of FIG. 1, including the fixed mount, the screw housing, and the screw of the tensioner.

The fixed mount 26 includes a base panel 40 coupled to the end 18 of the band 12, a flange 42 coupled to one side of the base panel 40, and a flange 44 coupled to another, opposite side of the base panel 40, as shown in FIGS. 2-4. The base panel 40 interconnects lower ends of the flanges 42, 44 and is attached to the end 18 of the band 12 to retain the tensioner 16 to the band 12. The screw housing 28 is arranged above the base panel 40 and between the flanges 42, 44. The flanges 42, 44 extend upwardly away from the base panel 40 and support the screw housing 28 and the screw 30 relative to the band 12.

Figure 8:
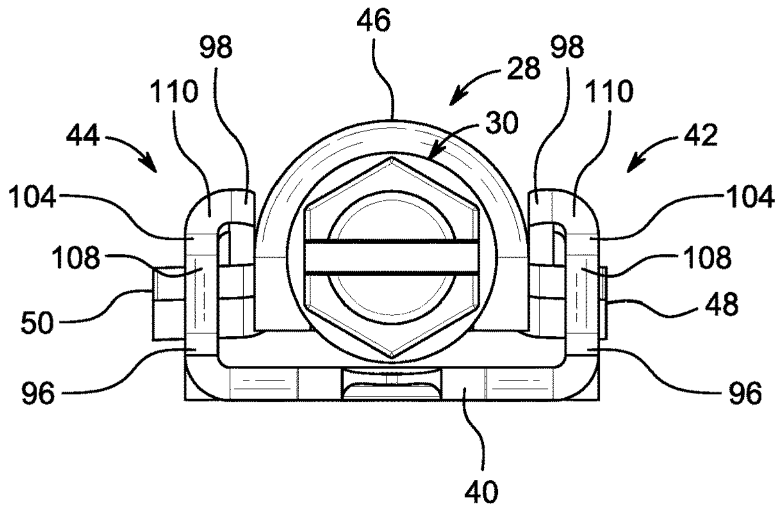
FIG. 8 is a front elevation view of the tensioner of FIG. 2.
Figure 9:
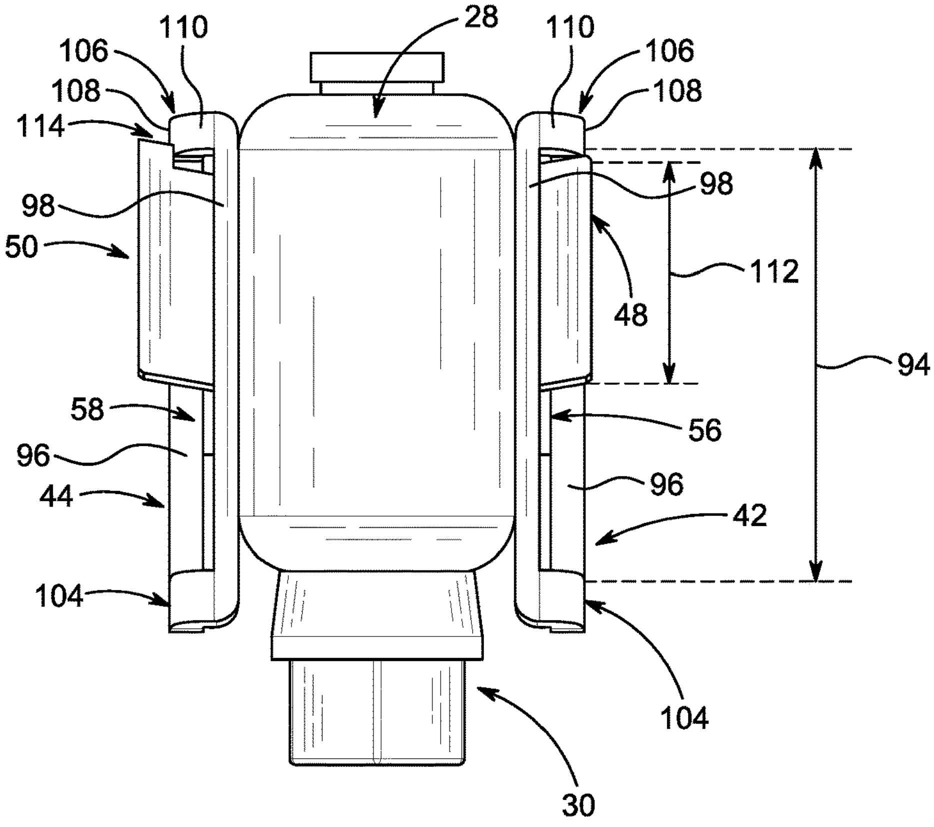
FIG. 9 is a top plane view of the tensioner of FIG. 2.

The screw housing 28 includes a dome 46, a wing 48 coupled to one side of the dome 46, and a wing 50 coupled to another, opposite side of the dome 46, as best seen in FIGS. 4, 8 and 9. The dome 46 defines the screw-receiving space 36 which receives a portion of the screw 30. The dome 46 is formed to include forward and aft screw-bearing apertures 52, 54 that engage portions of a screw shaft 78 of the screw 30. The wings 48, 50 extend laterally outward away from the dome 46 and engage a corresponding one of the flanges 42, 44 to retain the screw housing 28 and the screw 30 to the fixed mount 26.

The flange 42 is formed to include a guide channel 56, and the flange 44 is formed to include a guide channel 58, as best seen in FIGS. 4, 8, and 9. The wing 48 is received in the guide channel 56, while the wing 50 is received in the guide channel 58. The guide channels 56, 58 guide the screw housing 28 (and, thus, the screw 30) for movement relative to the fixed mount 26 between an engaged position, shown in FIGS. 2 and 6, and a disengaged position, shown in FIGS. 3 and 7. In the engaged position, the wings 48, 50 are positioned at lower ends 60, 62 of the guide channels 56, 58 and the thread 80 of the screw 30 is received within at least one slot of the plurality of slots 24 formed in the band 12. In the disengaged position, the wings 48, 50 are positioned at upper ends 64, 66 of the guide channels 56, 58 and the thread 80 of the screw 30 is removed from the plurality of slots 24 formed in the band 12. In the disengaged position, the thread 80 of the screw 30 may be spaced apart from the band 12 to provide a clearance gap 68 therebetween to allow the band 12 to be moved past the screw 30 to tighten or loosen the band 12 without twisting the screw 30 about the screw axis 38. The clearance gap 68 may be greater than or about equal to zero.

Figure 5:
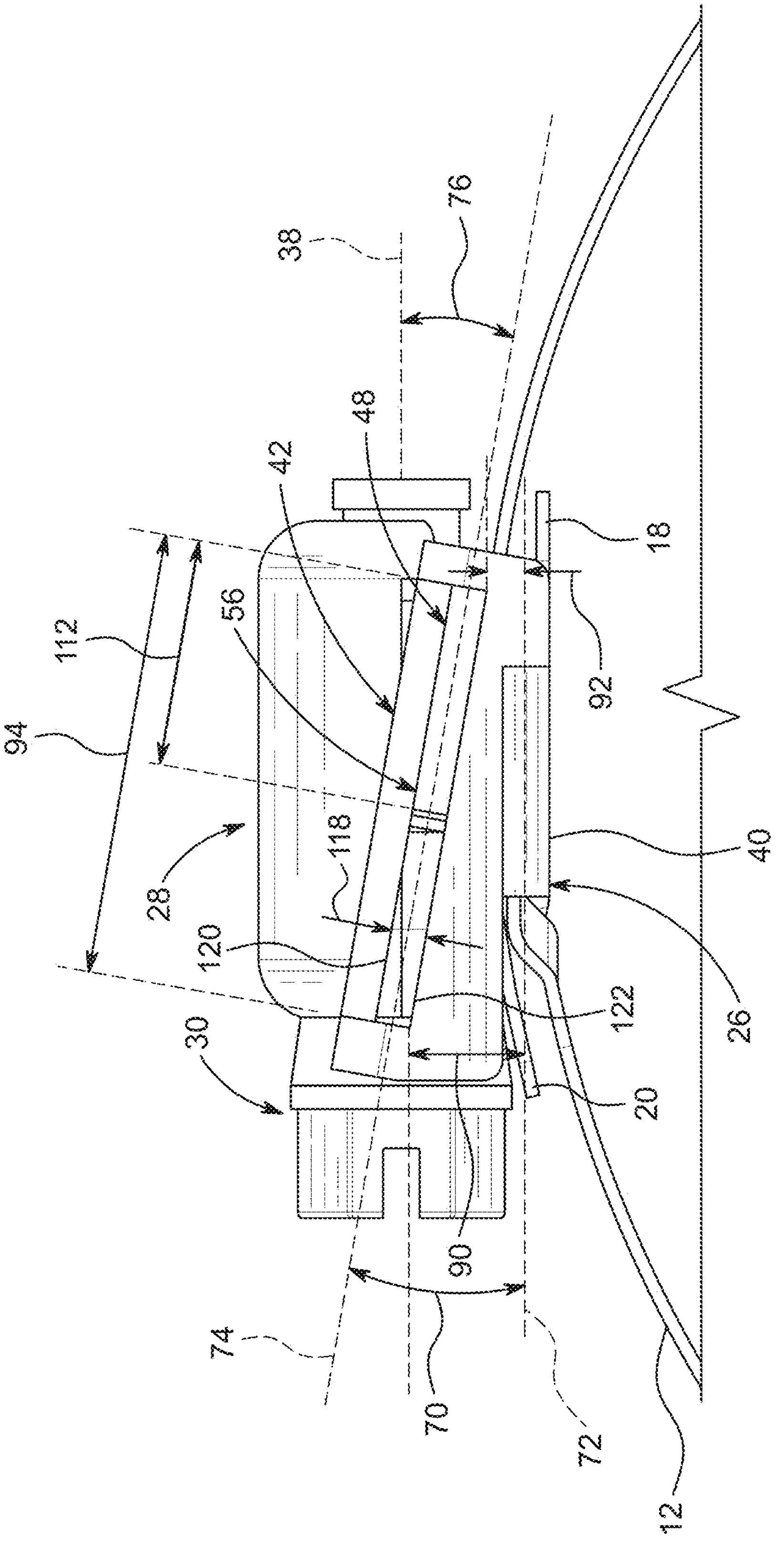
FIG. 5 is a side elevation view of the portion of the clamp shown in FIG. 2.

As shown in FIG. 5, the guide channel 56 has a height 118 that is defined as the smallest distance between an upper edge 120 of the guide channel 56 and a lower edge 122 of the guide channel 56. The guide channel 58 has a similarly defined height 118. In the illustrative embodiment, the upper and lower edges 120, 122 of the guide channels 56, 58 are linear surfaces of the flanges 42, 44 which are non-parallel to the features of the fixed mount 40 as well as a portion of the band 12 located between the screw housing 28 and the fixed mount 40, as shown in FIG. 5. As such, in the illustrative embodiment, the guide channels 56, 58 are entirely linear between the lower ends 60, 62 and the upper ends 64, 66 such that the screw housing 28 and the screw 30 are movable only in a linear direction between the lower ends 60, 62 and the upper ends 64, 66. Furthermore, in the illustrative embodiment, each of the wings 48, 50 has a length 112 (measured parallel to the upper and lower edges 120, 122 of the guide channels 56, 58) that is greater than the height 118 of the corresponding guide channel 56, 58. It is contemplated that, in other embodiments, the guide channels may have non-linear shapes (e.g., curves), or even be partially linear and partially non-linear.

Returning to the illustrative embodiment, the guide channels 56, 58 extend along a plane 74 which is arranged to lie at an angle 70 relative to the base panel 40. The guide channels 56, 58 extend only along the plane 74 in the illustrative embodiment. The angle 70 is an acute angle relative to the base panel 40. In some embodiments, the angle 70 is within a range of 10 degrees to 45 degrees. In other embodiments, the angle 70 is within a range of 25 degrees to 35 degrees. In the illustrative embodiment, the angle 70 is 30 degrees. The guide channels 56, 58 are also arranged to lie at an acute angle 76 relative to the screw rotation axis 38. The screw rotation axis 38 may be substantially parallel to the plane 72 such that the angles 70, 76 are about equal to one another. Since the guide channels 56, 58 are linear in the illustrative embodiment, the angles 70, 76 do not change when the screw housing 28 and the screw 30 move between the engaged and disengaged positions.

Figure 6:
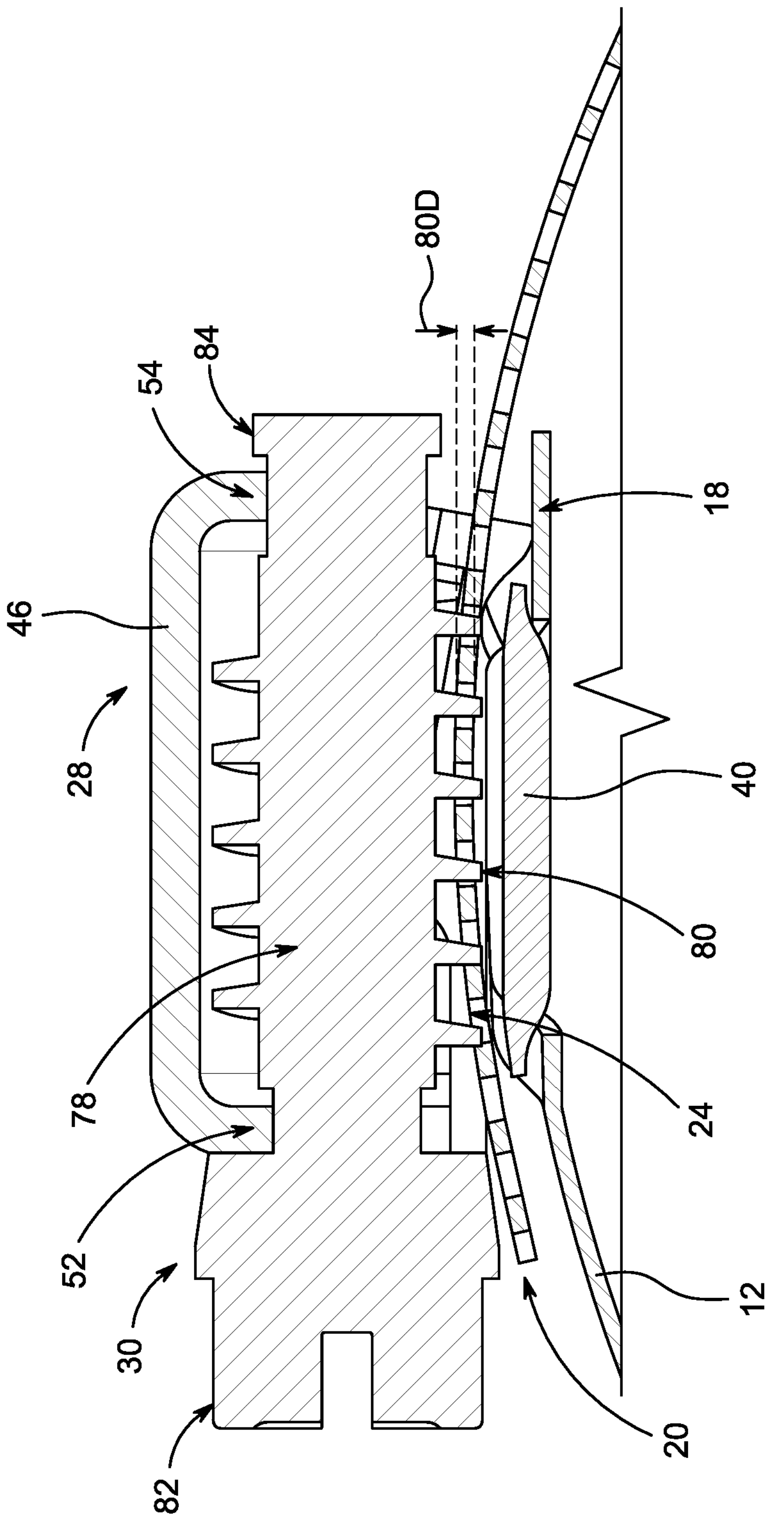
FIG. 6 is a cross section of the portion of the clamp shown in FIG. 2, taken along line 6-6 in FIG. 2.
Figure 7:
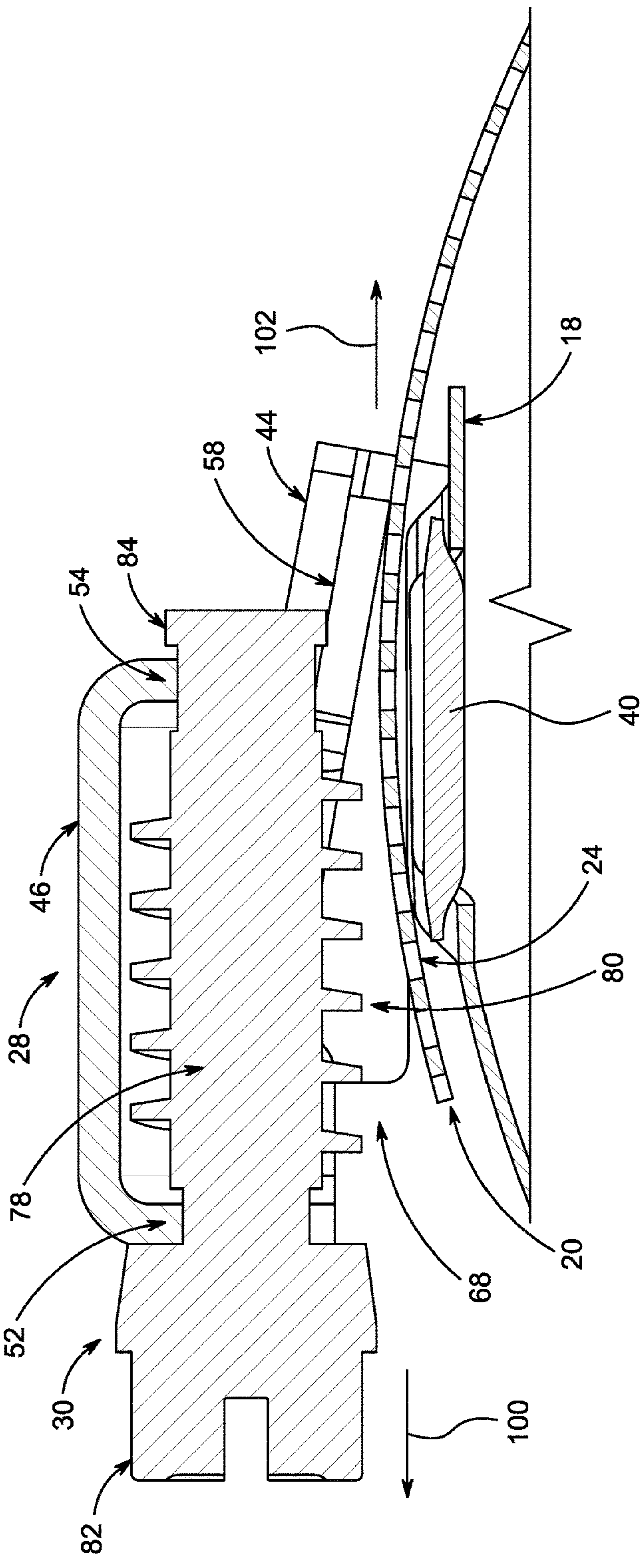
FIG. 7 is a cross section of the portion of the clamp shown in FIG. 3, taken along line 7-7 in FIG. 3.

The screw 30 includes the screw shaft 78 and the thread 80 extending outwardly from the screw shaft 78 relative to the screw rotation axis 38, as shown in FIGS. 3, 6 and 7. The screw 30 may further include a screw head 82 and a screw base 84 located on opposite ends of the screw shaft from one another. In the illustrative embodiment, the screw head 82 is hexagonal in shape and is formed to include a slot so that a tool can be used to engage the screw head 82 and rotate the screw 30 about the screw rotation axis 38. Thus, the screw head 82 is arranged outside of the screw-receiving space 36 at an end of the screw housing 28 that faces in the tightening direction 100. The screw base 84 is arranged to lie outside of the screw-receiving space 36 at an end of the screw housing 28 that faces in the loosening direction 102. Both the screw head 82 and the screw base 84 have outer dimensions that are greater than front and rear apertures 52, 54 formed in the screw housing 28 leading to the screw-receiving space 36 to block the thread 80 of the screw from being removed from the screw-receiving space 36.

Each of the lower ends 60, 62 of the guide channels 56, 58 is spaced apart from the base panel 40 by a distance 90, and each of the upper ends 64, 66 of the guide channels 56, 58 is spaced apart from the base panel 40 by a distance 92 greater than the distance 90. In the illustrative embodiment, the guide channels 56, 58 are linear and have a length and slope sufficient to remove the thread 80 from the plurality of slots 24 when the wings 48, 50 reach the upper ends 64, 66 of the guide channels 56, 58. Illustratively, the guide channels 56, 58 each have a linear length 94 that is greater than a depth 80D of the thread 80 divided by a sine of the angle 70. Thus, the vertical rise provide by the slope of the guide channels 56, 58 is sufficient to remove the thread 80 from the slots 24 when the screw housing 28 and screw 30 reach the disengaged position. In one example, the depth 80D is greater than or equal to a thickness of the band 12.

During use, the end 20 of the band 12 is configured to be fed between the base panel 40 and the screw 30 in the tightening direction 100. During this movement of the end 20 of the band 12, the screw housing 28 and the screw 30 are able to move toward the disengaged position as the end 20 of the band 12 is moved in the tightening direction 100 to allow tightening of the band 12 without rotation of the screw 30 about the screw rotation axis 38. Upon release of the band 12, the screw housing 28 and the screw 30 can move toward the engaged position, in which the thread 80 of the screw 30 engages at least one slot 24 to block the band from moving in the loosening direction 102. In this way, the tensioner 16 allows the thread 80 of the screw 30 to be spaced apart from the plurality of slots 24 during movement of the band 12 in tightening direction 100 to provide a quick, initial tightening function (e.g., by hand), but also to lock the band 12 against undesired movement in the loosening direction 102. The screw 30 may then be rotated clockwise about the screw rotation axis 36 to further tighten the band 12. During loosening of the band 12, once sufficient tension has been removed from the band 12 by counter-clockwise rotation of the screw 30 about the screw rotation axis 36, the screw housing 28 and the screw 30 may be moved into the disengaged position to allow quick release of the band 12 from the tensioner 16 (without further need to rotate the screw 30).

Each of the flanges 42, 44 is substantially similar to one another, as shown in FIGS. 8 and 9. Each flange 42, 44 includes a flange base 96 coupled to the base panel 40, a wing support 98 spaced apart from the flange base 96, and a pair of links 104, 106 interconnecting the flange base 96 and the wing support 98. The flange bases 96 and the wing supports 98 define the guide channels 56, 58 vertically therebetween. The links 104, 106 are arranged at forward and rear ends of the fixed mount 26 and define the guide channels 56, 58 horizontally therebetween.

The links 104, 106 include a vertically-extending, lower strip 108 and a curved upper strip 110, as shown in FIGS. 8 and 9. The vertically-extending, lower strips 108 are coupled to the flange base 96 and extend upwardly therefrom. The curved upper strips 110 are coupled to a distal end of the vertically-extending, lower strips 108 and extend toward one another and toward the dome 46. The wing supports 98 are offset inwardly from the flange base 96 such that the wing supports 98 are closer to the dome 46 than the flange base 96.

In the illustrative embodiment, the length 112 of each of the wings 48, 50 is about half of the length 94 of the guide channels 56, 58, as shown in FIGS. 5 and 9. The wing 50 protrudes laterally outward away from the dome 46 further than the wing 48. The wing 50 also includes a locator tab 114 that extends rearwardly in the loosening direction 102 of the band 12. The locator tab 114 engages the fixed mount 26 in the engaged position to block rotation of the screw housing 28 and the screw 30 about an axis 116 that is perpendicular to the screw rotation axis 38 during twisting of the screw 30 to tighten the band 12. In particular, the locator tab 114 engages an outer surface of the link 106 near the rear end of the fixed mount 26. In some embodiments, the wing 48 may also include a locator tab.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

The invention claimed is:

1. A clamp comprising:

a band including a first end, a second end opposite the first end, and a plurality of slots spaced apart from one another between the first and second ends, and a tensioner comprising:

a fixed mount including (i) a base panel coupled to the first end of the band, the base panel including opposing first and second sides, (ii) a first flange coupled to the first side of the base panel and formed to include a first guide channel having a first height, and (iii) a second flange coupled to the second side of the base panel and formed to include a second guide channel having a second height, wherein the first height of the first guide channel is a smallest distance between an upper edge of the first guide channel and a lower edge of the first guide channel, and wherein the second height of the second guide channel is a smallest distance between an upper edge of the second guide channel and a lower edge of the second guide channel, a screw housing arranged above the base panel and between the first and second flanges of the fixed mount, the screw housing including a first wing that is received in the first guide channel and a second wing that is received in the second guide channel, the first wing having a first length measured parallel to the upper and lower edges of the first and second guide channels that is greater than the first height, the second wing having a second length measured parallel to the upper and lower edges of the first and second guide channels that is greater than the second height, and a screw received in the screw housing, wherein the screw housing and the screw can move relative to the fixed mount between (i) an engaged position in which the first wing is positioned at a lower end of the first guide channel and the second wing is positioned at a lower end of the second guide channel and (ii) a disengaged position in which the first wing is positioned at an upper end of the first guide channel and the second wing is positioned at an upper end of the second guide channel, wherein, when a portion of the band including the plurality of slots is positioned between the fixed mount and the screw housing, a thread of the screw is (i) received in the plurality of slots when the screw housing and the screw are in the engaged position and (ii) spaced apart from the plurality of slots when the screw housing and the screw are in the disengaged position, and wherein at least one of the first and second wings includes a locator tab that engages the fixed mount in the engaged position to block rotation of the screw housing and the screw about an axis that is perpendicular to the screw rotation axis during twisting of the screw to tighten the band.

2. The clamp of claim 1, wherein the screw is rotatable within the screw housing about a screw axis, wherein movement of the portion of the band positioned between the fixed mount and the screw housing requires rotation of the screw about the screw axis when the screw housing and the screw are in the engaged position, and wherein movement of the portion of the band positioned between the fixed mount and the screw housing does not require rotation of the screw about the screw axis when the screw housing and the screw are in the disengaged position.

3. The clamp of claim 2, wherein the screw axis is parallel to the base panel when the screw housing and the screw are in the engaged position.

4. The clamp of claim 3, wherein the screw axis remains parallel to the base panel when the screw housing and the screw are in the disengaged position.

5. The clamp of claim 1, wherein each of the first and second guide channels is linear and arranged at an angle relative to the base panel.

6. The clamp of claim 5, wherein the angle is acute.

7. The clamp of claim 5, wherein the angle is between 10 and 45 degrees.

8. The clamp of claim 5, wherein the angle is between 25 and 35 degrees.

9. The clamp of claim 5, wherein each of the first and second guide channels has a length between its lower and upper ends that is greater than a depth of the thread of the screw divided by a sine of the angle.

10. The clamp of claim 1, wherein each of the lower ends of the first and second guide channels is spaced apart from the base panel by a first distance, and wherein each of the upper ends of the first and second guide channels is spaced apart from the base panel by a second distance greater than the first distance.

11. The clamp of claim 1, wherein the locator tab extends beyond the lower end of the first and second guide channels in the engaged position.

12. The clamp of claim 1, wherein the first wing protrudes laterally outward further than the second wing.

13. The clamp of claim 1, wherein each flange includes a flange base coupled to the base panel, a wing support spaced apart from the flange base, and a pair of links interconnecting the flange base and the wing support, and wherein the flange base and the wing support define a corresponding guide channel vertically therebetween and each link of the pair of links is arranged at a forward end and a rear end of the fixed mount, respectively, to locate each corresponding guide channel horizontally therebetween.

14. The clamp of claim 13, wherein each link includes a vertically-extending, lower strip coupled to the flange base and a curved upper strip coupled to the wing support.

15. The clamp of claim 14, wherein the wing support is offset inwardly from the flange base such that the wing support is closer to the screw than the flange base.

16. The clamp of claim 15, wherein the locator tab protrudes laterally outward further than the links and engages an outer surface of one of the links in the engaged position.

* * * * *